United States Patent
Wang et al.

(10) Patent No.: US 7,447,355 B2
(45) Date of Patent: Nov. 4, 2008

(54) METHOD FOR DEFINING CHROMATICITY REGIONS ACCORDING TO LUMINANCE LEVELS AND ADJUSTING CHROMATICITY OF IMAGES ACCORDINGLY

(75) Inventors: Tsung-Ming Wang, Hsinchu (TW); Hsi-Chun Huang, Hsinchu (TW); Chao-Chee Ku, Hsinchu (TW)

(73) Assignee: Weltrend Semiconductor Inc., Hsinchu (TW)

( * ) Notice: Subject to any disclaimer, the term of this patent is extended or adjusted under 35 U.S.C. 154(b) by 673 days.

(21) Appl. No.: 10/908,511

(22) Filed: May 16, 2005

(65) Prior Publication Data
US 2006/0188152 A1    Aug. 24, 2006

(30) Foreign Application Priority Data
Feb. 24, 2005    (TW) ............................ 94105619 A

(51) Int. Cl.
*G06K 9/00* (2006.01)
*G09G 5/02* (2006.01)
*G03F 3/08* (2006.01)
(52) U.S. Cl. .................... 382/167; 345/589; 358/518
(58) Field of Classification Search .............. 382/162, 382/167; 345/589; 358/518, 520

See application file for complete search history.

(56) References Cited

U.S. PATENT DOCUMENTS

| 6,011,595 | A * | 1/2000 | Henderson et al. ........... 348/590 |
| 6,823,083 | B1 * | 11/2004 | Watanabe et al. ........... 382/167 |
| 2003/0234756 | A1 * | 12/2003 | Ku et al. ........................ 345/88 |
| 2004/0071343 | A1 * | 4/2004 | Yamazoe et al. ............. 382/167 |
| 2004/0165772 | A1 * | 8/2004 | Russell et al. ................ 382/167 |
| 2005/0044371 | A1 * | 2/2005 | Braudaway et al. .......... 713/176 |
| 2005/0185839 | A1 * | 8/2005 | Matsubara ................... 382/167 |
| 2005/0190205 | A1 * | 9/2005 | Koyama ...................... 345/690 |

OTHER PUBLICATIONS

Wong et al. ("An Efficient Color Compensation Scheme for Skin Color Segmentation," IEEE Int'l Symp. Circuits and Systems, 2003, pp. 676-679; submitted as part of the IDS).*
Kwok-Wai Wong et al., An Efficient Color Compensation Scheme for Skin Color Segmentation, ISCAS '03 (International Symposium on Circuits and Systems, 2003.), pp. 676-679, 2003 IEEE.

* cited by examiner

*Primary Examiner*—Yubin Hung
(74) *Attorney, Agent, or Firm*—Winston Hsu

(57) ABSTRACT

Image processing includes defining chromaticity regions according to different luminance levels, and when the luminance of a pixel corresponds to one of the luminance levels, and a chromaticity vector of the pixel is within a chromaticity region corresponding to the luminance level, adjusting the chromaticity vector of the pixel.

30 Claims, 2 Drawing Sheets

METHOD FOR DEFINING CHROMATICITY REGIONS ACCORDING TO LUMINANCE LEVELS AND ADJUSTING CHROMATICITY OF IMAGES ACCORDINGLY

BACKGROUND OF INVENTION

1. Field of the Invention

The present invention relates to an image processing method, and more particularly, to a method for defining chromaticity regions according to luminance levels and adjusting the chromaticity of images accordingly.

2. Description of the Prior Art

A skin-tone correction method is designed to adjust chromaticity of a pixel by first determining whether a chromaticity vector of the pixel is within a predetermined skin-tone region, i.e. first determining whether a video of the pixel looks like human skin, and then rotating the chromaticity vector of the pixel toward a central axis in the predetermined skin-tone region by a predetermined adjusting angle. After determining that the chromaticity vector of the pixel is indeed within the predetermined skin-tone region, the video of the pixel, with an adjusted chromaticity vector, looks more like human skin.

However, a color model where the chromaticity vector is located looks like an olive, with a wide waist and a narrow head and tail. A first position where a first pixel is located in the color model is different from a second position where a second pixel has a luminance level different from that of the first pixel, even though the first pixel has a chromaticity vector totally the same as that of the second pixel. In other words the first pixel, assumed to have too large a luminance level to fall in a region inside of the color model and probably not having its first chromaticity vector within the predetermined skin-tone region, is likely to be determined the same as the second pixel, which has a second chromaticity vector the same as the first chromaticity vector, but a smaller luminance level and is located within the olive-shaped color model. Therefore, the skin-tone correction method is likely to erroneously determine a nonhuman pixel, which is located in a region outside of the olive-shaped color model, to be a human pixel.

Moreover, the predetermined skin-tone region is very small, so the skin-tone correction method is likely to erroneously determine a human pixel to be a nonhuman pixel.

Lastly, after determining that the pixel is indeed human skin, the skin-tone correction method rotates the chromaticity vector toward a central axis by a constant adjusting angle, which lacks flexibility, and can be inaccurate.

SUMMARY OF INVENTION

It is therefore a primary objective of the claimed invention to provide a method for defining chromaticity regions according to luminance levels and adjusting chromaticity of images accordingly to overcome the above-mentioned problems.

According to the claimed invention, the method includes the steps of: (a) defining a plurality of chromaticity regions according to a variety of luminance levels, and (b) multiplying a pixel's original chromaticity vector by an adjusting factor to form an adjusted chromaticity vector, where the pixel's original chromaticity vector corresponds to one of the chromaticity regions set in step (a), which in turn corresponds to a luminance level of the pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
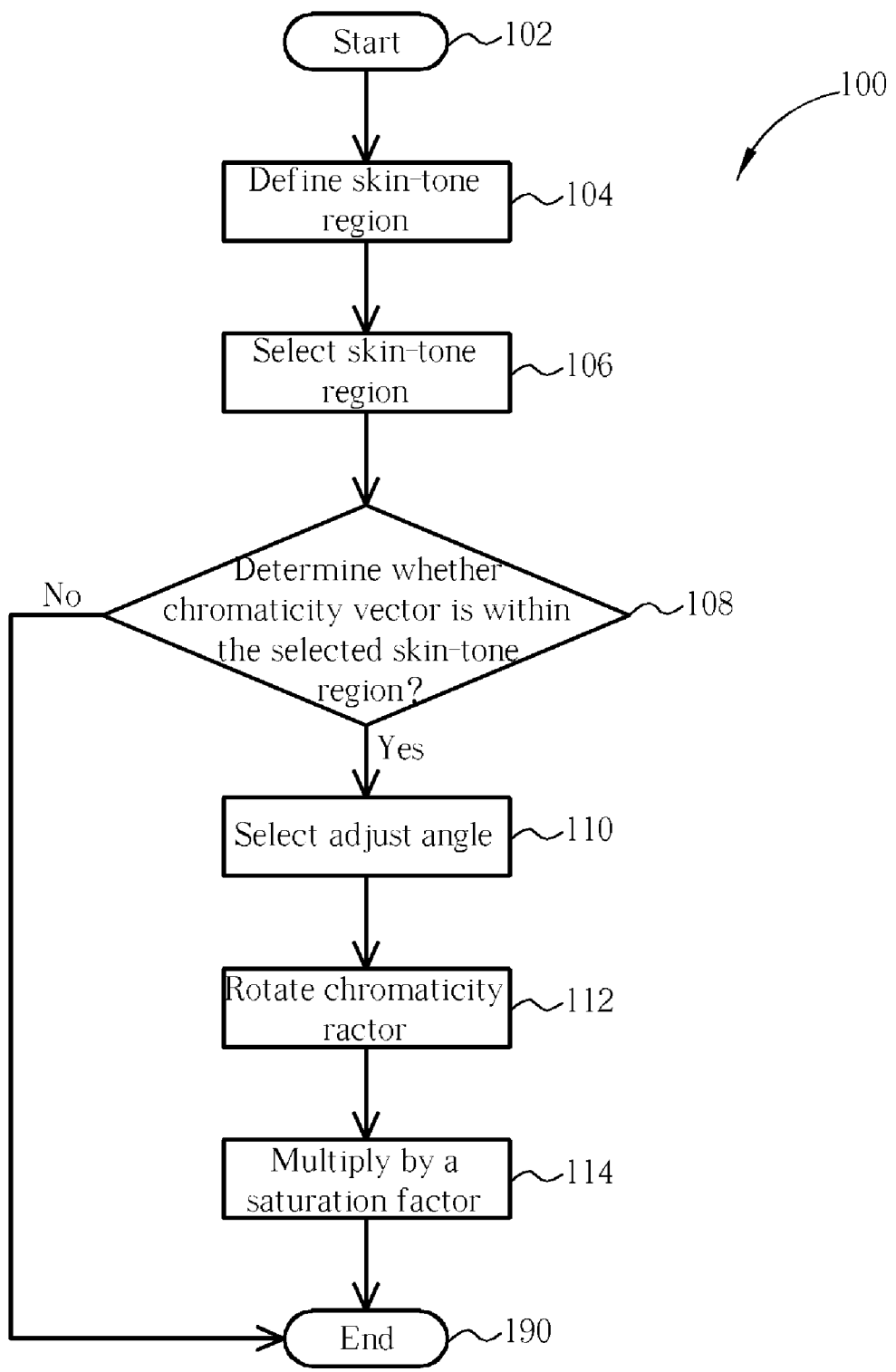
FIG. 1 is a flow chart of a skin-tone correction method according to the present invention.
Figure 2:
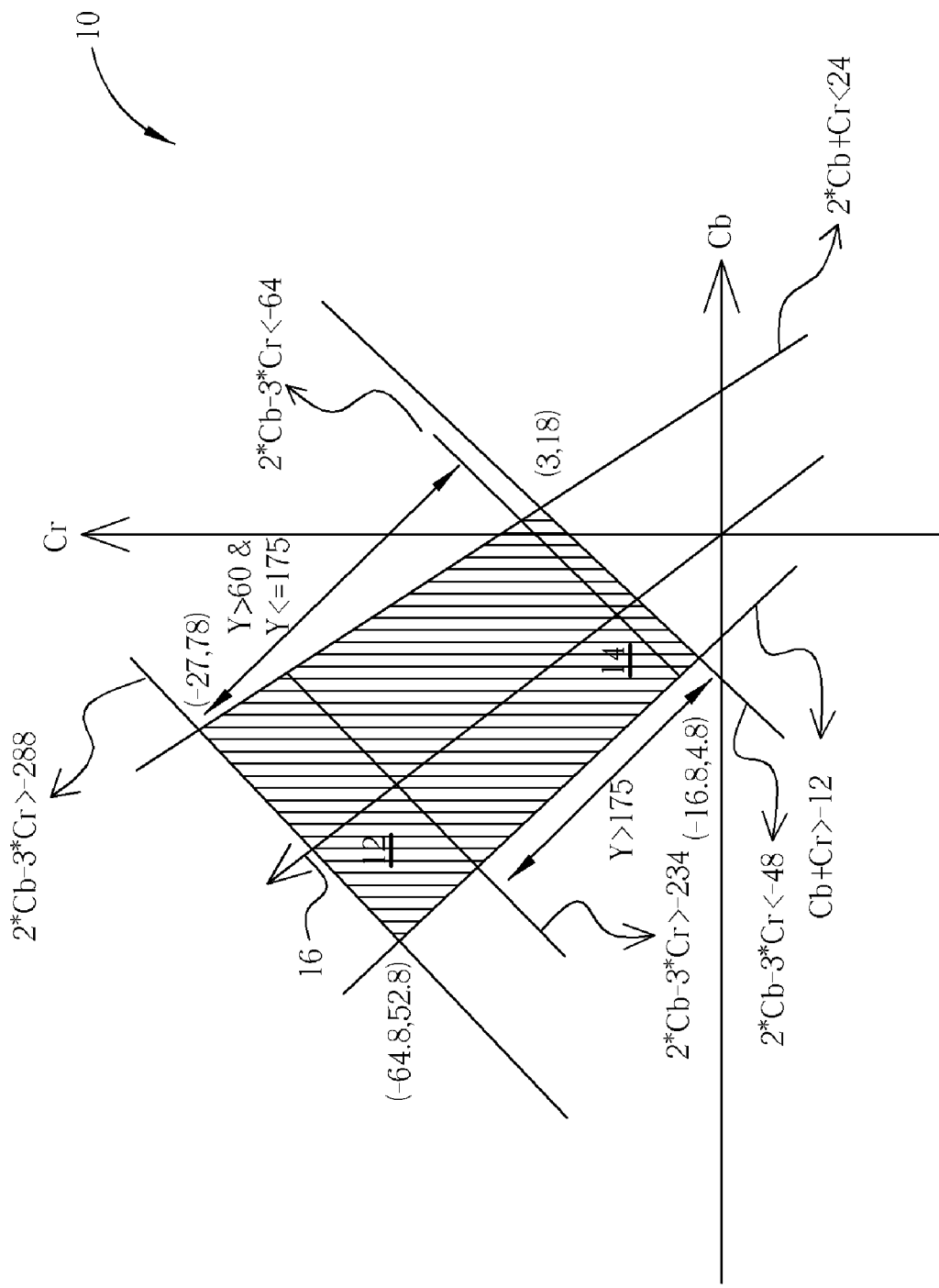
FIG. 2 is a Cartesian coordinate diagram of a chromaticity region according to the present invention.

Please refer to FIG. 1 and FIG. 2. FIG. 1 is a flow chart of a skin-tone correction method 100 of the preferred embodiment according to the present invention. FIG. 2 is a Cartesian coordinate diagram of a chromaticity region 10 according to the present invention, where an abscissa represents $C_b$ and an ordinate $C_r$. The present invention, though the skin-tone correction method 100 is used as an example to describe its preferred embodiment, is not limited to skin-tone correction, but to any imaging processes having color characteristics similar to those of the skin-tone correction. For example, the present invention can be applied to adjust chromaticity of a petal, a car's body, or computer housing. The skin-tone correction method 100 comprises the following steps:

step 102: Start;

step 104: Defining a plurality of skin-tone regions according to a variety of luminance levels Y, Y having eight bits for example;

(The chromaticity region 10 shown in FIG. 2 comprises a first skin-tone region 12 and a second skin-tone region 14, with the first skin-tone region 12 corresponding to a first luminance level larger than 60 but not larger than 175, a pixel within the first skin-tone region 12 having a chromaticity vector ($C_b$, $C_r$), and all conforming to the following restraints:

$2*C_b - 3*C_r < -64$, $2*C_b - 3*C_r > -288$, $C_b + C_r > -12$, and $2*C_b + C_r < 24$ , and the second skin-tone region 14 corresponding to a second luminance level larger than 175, a pixel within the second skin-tone region 14 having a chromaticity vector ($C_b$, $C_r$), and conforming to the following restraints:

$2*C_b - 3*C_r < -48$, $2*C_b - 3*C_r > -234$, $C_b + C_r > -12$, and $2*C_b + C_r < 24$.)

step 106: Selecting one of the skin-tone regions according to a luminance level of a pixel P;

(If the luminance level of the pixel P is larger than 60 but not larger than 175, the first skin-tone region 12 is selected. On the other hand, if the luminance level of the pixel P is larger than 175, the second skin-tone region 14 is selected.)

step 108: Determining whether or not an original chromaticity vector $V_{org}$ where the pixel P is located in the chromaticity region 10 falls in the skin-tone region selected in step 106. If yes, go to step 110, if no, go to step 190;

(If the luminance level of the pixel P is larger than 60 but not larger than 175, the chromaticity vector $V_{org}$ where the pixel P is located in the chromaticity region 10 is determined to be within the first skin-tone region 12. On the other hand, If the luminance level of the pixel P is larger than 175, the chromaticity vector $V_{org}$ where the pixel P is located in the chromaticity region 10 is determined to be within the second skin-tone region 14.)

step 110: Selecting an adjusting angle from an adjusting group consisting of a plurality of adjusting angles;

(So far, a video of the pixel P is determined to be human skin. In the preferred embodiment, the adjusting group consists of a first adjusting angle equal to 2.8 degrees, a second adjusting angle equal to 5.6 degrees, a third adjusting angle equal to 8.4 degrees, and a fourth adjusting angle equal to 11.2 degrees.)

Step 112: Rotating the original chromaticity vector $V_{org}$ of the pixel P toward a central axis 16 of the chromaticity diagram 10 by the adjusting angle selected in step 110 to form an adjusted chromaticity vector $V_{adj}$;

(So far, no matter if its luminance level is very large (larger than 175) or small (smaller than 175), the pixel P will be correctly determined to be located in the skin-tone region to which its luminance level corresponds. Therefore, the skin-tone method 100 will not erroneously determine a nonhuman pixel, which is located in a region outside of the olive-shaped color model, to be a human pixel.)

step 114: Multiplying the adjusted chromaticity vector $V_{adi}$ by a saturation factor;

(In order to make a video of the pixel P, with the adjusted chromaticity vector $V_{adj}$, look more vivid, the adjusted chromaticity vector $V_{adj}$ is multiplied by a saturation factor larger than one. In the preferred embodiment, the saturation factor is equal to 1.1.)

step 190: End.

(If the skin-tone correction method 100 goes here from step 108, the video of the pixel P is determined to not be human skin. The skin-tone method 100 will not make an erroneous judgment that a nonhuman pixel, which is located in a region outside of the olive-shaped color model, is a human pixel.)

In steps 110 and 112 of the skin-tone method 100, the original chromaticity vector $V_{org}$ of the pixel P is rotated toward the central axis 16 of the chromaticity region 10 by the first adjusting angle (2.8 degrees) to form the adjusted chromaticity vector $V_{adj}$. Equivalently, the adjusted chromaticity vector $V_{adj}$ is equal to the original chromaticity vector $V_{org}$ multiplied by a first adjusting factor $A_1$ equal to $$\begin{bmatrix} 0.894 & -0.075 \\ -0.070 & 0.948 \end{bmatrix}.$$

Similarly, rotating the original chromaticity vector $V_{org}$ of the pixel P toward the central axis 16 of the chromaticity region 10 by the second (5.6 degrees), the third (8.4 degrees), and the fourth (11.2 degrees) adjusting angles, respectively, is equivalent to multiplying the original chromaticity vector $V_{org}$ by a second adjusting factor $A_2$ equal to $$\begin{bmatrix} 0.792 & -0.151 \\ -0.139 & 0.902 \end{bmatrix},$$

a third adjusting factor $A_3$ equal to $$\begin{bmatrix} 0.688 & -0.223 \\ -0.206 & 0.850 \end{bmatrix},$$

and a fourth adjusting factor $A_4$ equal to $$\begin{bmatrix} 0.588 & -0.297 \\ -0.275 & 0.802 \end{bmatrix}$$

respectively.

Moreover, in steps 110, 112 and 114 of the skin-tone method 100, the original chromaticity vector $V_{org}$ of the pixel P is rotated toward the central axis 16 of the chromaticity region 10 by the first adjusting angle (2.8 degrees) to form the adjusted chromaticity vector $V_{adj}$, and the adjusted chromaticity vector $V_{adj}$ is then multiplied by the saturation factor equal to 1.1. The adjusted chromaticity vector $V_{adj}$, multiplied by the saturation factor, is equal to the original chromaticity vector $V_{org}$, multiplied by another first adjusting factor $A_1'$ equal to $$\begin{bmatrix} 0.984 & -0.083 \\ -0.077 & 1.044 \end{bmatrix}.$$

Similarly, rotating the original chromaticity vector $V_{org}$ of the pixel P toward the central axis 16 of the chromaticity coordinate 10 by the second (5.6 degrees), the third (8.4 degrees), and the fourth (11.2 degrees) adjusting angles, respectively, to form a threefold adjusted chromaticity vector $V_{adj}$, and then multiplying the threefold adjusted chromaticity vector $V_{adj}$ by the saturation factor equal to 1.1, is equivalent to multiplying the original chromaticity vector $V_{org}$ by another second adjusting factor $A_2'$ equal to $$\begin{bmatrix} 0.871 & -0.165 \\ -0.153 & 0.990 \end{bmatrix},$$

another third adjusting factor $A_3'$ equal to $$\begin{bmatrix} 0.758 & -0.246 \\ -0.228 & 0.936 \end{bmatrix},$$

and another fourth adjusting factor $A_4'$ equal to $$\begin{bmatrix} 0.645 & -0.328 \\ -0.304 & 0.882 \end{bmatrix},$$

respectively.

In the skin-tone method 100, although the pixel P is represented according to the Y, $C_b$, $C_r$) color model in CIE standard, a skin-tone correction method of the present invention can be applied to adjust pixels represented according to any color model. For example, the pixel can be represented according to a (U, V, W) color model in CIE standard, a (Y, I, Q) color model in NTSC standard, a (Y, U, V) color model in PAL standard, or a digitized component signal (W, Pb, Pr) color model. Any two color models have a corresponding predetermined transform formula. That is, any color model can be obtained through a calculation of its corresponding color model and predetermined transform formula. For example, a predetermined transform formula between a (R, G, B) color model and a (Y, I Q) color model in NTSC standard is $$\begin{bmatrix} 0.299 & 0.587 & 0.114 \\ 0.596 & -0.275 & -0.321 \\ 0.212 & -0.523 & 0.311 \end{bmatrix}, \text{ so}$$

$$(Y, I, Q) = \begin{bmatrix} 0.299 & 0.587 & 0.114 \\ 0.596 & -0.275 & -0.321 \\ 0.212 & -0.523 & 0.311 \end{bmatrix} (R, G, B).$$

In contrast to the prior art, the present invention's advantage is that the skin-tone correction method is designed to select one of the skin-tone regions according to a luminance level of a pixel P, and determine whether or not an original chromaticity vector of the pixel is within the selected skin-tone region. Therefore, the skin-tone correction method of the present invention will not make any erroneous judgments that a nonhuman pixel, which is located in a region outside of the olive-shaped color model, is a human pixel. Moreover, the present invention provides a plurality of adjusting angles. Therefore, after determining that a video of the pixel is a human video, the skin-tone correction method can rotate the pixel's original chromaticity vector toward the central axis by an adjusting angle corresponding to one of the adjusting factors. p Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for defining a plurality of chromaticity regions according to luminance levels and adjusting chromaticity of images accordingly, the method comprising the steps of:
   (a) defining a plurality of chromaticity regions according to a variety of luminance levels; and
   (b) multiplying an original chromaticity vector of a pixel with an adjusting factor to form an adjusted chromaticity vector, the original chromaticity vector of the pixel corresponding to one of the chromaticity regions set in step (a), which corresponds to a luminance level of the pixel, wherein the chromaticity regions comprise a first chromaticity region corresponding to a first luminance level larger than 60 but not larger than 175, a pixel having a chromaticity vector within the first chromaticity region having a first chromaticity component and a second chromaticity component conforming to the following constraints: $2*C_b-3*C_r<-64$, $2*C_b-3*C_r>-288$, $C_b+C_r>-12$, and $2*C_b+C_r<24$, where $C_b$ is the first chromaticity component and $C_r$ the second chromaticity component.

2. The method of claim 1, wherein the chromaticity regions comprise a second chromaticity region corresponding to a second luminance level larger than 175, a pixel having a chromaticity vector within the second chromaticity region having a first chromaticity component and a second chromaticity component conforming to the following constraints: $2*C_b-3*C_r<-48$, $2*C_b-3*C_r>-234$, $C_b+C_r>-12$, and $2*C_b+C_r<24$, where $C_b$ is the first chromaticity component and $C_r$ the second chromaticity component.

3. The method of claim 1, wherein the adjusting factor is selected from an adjusting group consisting of a plurality of adjusting factors.

4. The method of claim 3, wherein the adjusting group comprises a first adjusting factor equal to $$\begin{bmatrix} 0.894 & -0.075 \\ -0.070 & 0.948 \end{bmatrix}.$$

5. The method of claim 3, wherein the adjusting group comprises a second adjusting factor equal to $$\begin{bmatrix} 0.792 & -0.151 \\ -0.139 & 0.902 \end{bmatrix}.$$

6. The method of claim 3, wherein the adjusting group comprises a third adjusting factor equal to $$\begin{bmatrix} 0.688 & -0.223 \\ -0.206 & 0.850 \end{bmatrix}.$$

7. The method of claim 3, wherein the adjusting group comprises a fourth adjusting factor equal to $$\begin{bmatrix} 0.588 & -0.297 \\ -0.275 & 0.802 \end{bmatrix}.$$

8. The method of claim 3, wherein the adjusting group comprises a first adjusting factor equal to $$\begin{bmatrix} 0.984 & -0.083 \\ -0.077 & 1.044 \end{bmatrix}.$$

9. The method of claim 3, wherein the adjusting group comprises a second adjusting factor equal to $$\begin{bmatrix} 0.871 & -0.165 \\ -0.153 & 0.990 \end{bmatrix}.$$

10. The method of claim 3, wherein the adjusting group comprises a third adjusting factor equal to $$\begin{bmatrix} 0.758 & -0.246 \\ -0.228 & 0.936 \end{bmatrix}.$$

11. The method of claim 3, wherein the adjusting group comprises a fourth adjusting factor equal to $$\begin{bmatrix} 0.645 & -0.328 \\ -0.304 & 0.882 \end{bmatrix}.$$

12. A method for defining a plurality of chromaticity regions according to luminance levels and adjusting chromaticity of images accordingly, the method comprising the steps of:

(a) defining a plurality of chromaticity regions according to a variety of luminance levels; and
(b) rotating an original chromaticity vector of a pixel toward a predetermined chromaticity vector by an adjusting angle to form an adjusted chromaticity vector, the original chromaticity vector of the pixel corresponding to one of the chromaticity regions set in step (a), which corresponds to a luminance level of the pixel,
wherein the chromaticity regions comprise a second chromaticity region corresponding to a second luminance level larger than 175, a pixel having a chromaticity vector within the second chromaticity region having a first chromaticity component and a second chromaticity component conforming to the following constraints: $2*C_b-3*C_r<-48$, $2*C_b-3*C_r>-234$, $C_b+C_r>-12$, and $2*C_b+C_r<24$, where $C_b$ is the first chromaticity component and $C_r$ the second chromaticity component.

13. The method of claim 12, wherein the chromaticity regions comprise a first chromaticity region corresponding to a first luminance level larger than 60 but not larger than 175, a pixel having a chromaticity vector within the first chromaticity region having a first chromaticity component and a second chromaticity component conforming to the following constraints: $2*C_b-3*C_r<-64$, $2*C_b-3*C_r>-288$, $C_b+C_r>-12$, and $2*C_b+C_r<24$, where $C_b$ is the first chromaticity component and $C_r$ the second chromaticity component.

14. The method of claim 12, wherein the adjusting angle is selected from an adjusting group consisting of a plurality of adjusting angles.

15. The method of claim 14, wherein the adjusting group comprises a first adjusting angle equal to 2.8 degrees.

16. The method of claim 14, wherein the adjusting group comprises a second adjusting angle equal to 5.6 degrees.

17. The method of claim 14, wherein the adjusting group comprises a third adjusting angle equal to 8.4 degrees.

18. The method of claim 14, wherein the adjusting group comprises a fourth adjusting angle equal to 11.2 degrees.

19. The method of claim 12 further comprising:
(c) multiplying the adjusted chromaticity vector by a saturation factor.

20. The method of claim 19, wherein the saturation factor is equal to 1.1.

21. A method for defining a plurality of chromaticity regions according to luminance levels and adjusting chromaticity of images accordingly, the method comprising the steps of:
(a) defining a plurality of chromaticity regions according to a variety of luminance levels; and
(b) multiplying an original chromaticity vector of a pixel with an adjusting factor to form an adjusted chromaticity vector, the original chromaticity vector of the pixel corresponding to one of the chromaticity regions set in step (a), which corresponds to a luminance level of the pixel,
wherein the chromaticity regions comprise a second chromaticity region corresponding to a second luminance level larger than 175, a pixel having a chromaticity vector within the second chromaticity region having a first chromaticity component and a second chromaticity component conforming to the following constraints: $2*C_b-3*C_r<-48$, $2*C_b-3*C_r>-234$, $C_b+C_r>-12$, and $2*C_b+C_r<24$, where $C_b$ is the first chromaticity component and $C_r$ the second chromaticity component.

22. The method of claim 21, wherein the adjusting factor is selected from an adjusting group consisting of a plurality of adjusting factors.

23. The method of claim 22, wherein the adjusting group comprises a first adjusting factor equal to $$\begin{bmatrix} 0.894 & -0.075 \\ -0.070 & 0.948 \end{bmatrix}.$$

24. The method of claim 22, wherein the adjusting group comprises a second adjusting factor equal to $$\begin{bmatrix} 0.792 & -0.151 \\ -0.139 & 0.902 \end{bmatrix}.$$

25. The method of claim 22, wherein the adjusting group comprises a third adjusting factor equal to $$\begin{bmatrix} 0.688 & -0.223 \\ -0.206 & 0.850 \end{bmatrix}.$$

26. The method of claim 22, wherein the adjusting group comprises a fourth adjusting factor equal to $$\begin{bmatrix} 0.588 & -0.297 \\ -0.275 & 0.802 \end{bmatrix}.$$

27. The method of claim 22, wherein the adjusting group comprises a first adjusting factor equal to $$\begin{bmatrix} 0.984 & -0.083 \\ -0.077 & 1.044 \end{bmatrix}.$$

28. The method of claim 22, wherein the adjusting group comprises a second adjusting factor equal to $$\begin{bmatrix} 0.871 & -0.165 \\ -0.153 & 0.990 \end{bmatrix}.$$

29. The method of claim 22, wherein the adjusting group comprises a third adjusting factor equal to $$\begin{bmatrix} 0.758 & -0.246 \\ -0.228 & 0.936 \end{bmatrix}.$$

30. The method of claim 22, wherein the adjusting group comprises a fourth adjusting factor equal to $$\begin{bmatrix} 0.645 & -0.328 \\ -0.304 & 0.882 \end{bmatrix}.$$

* * * * *